No. 874,697.
PATENTED DEC. 24, 1907.
G. A. McKEEL.
VEHICLE HUB.
APPLICATION FILED JUNE 29, 1907.
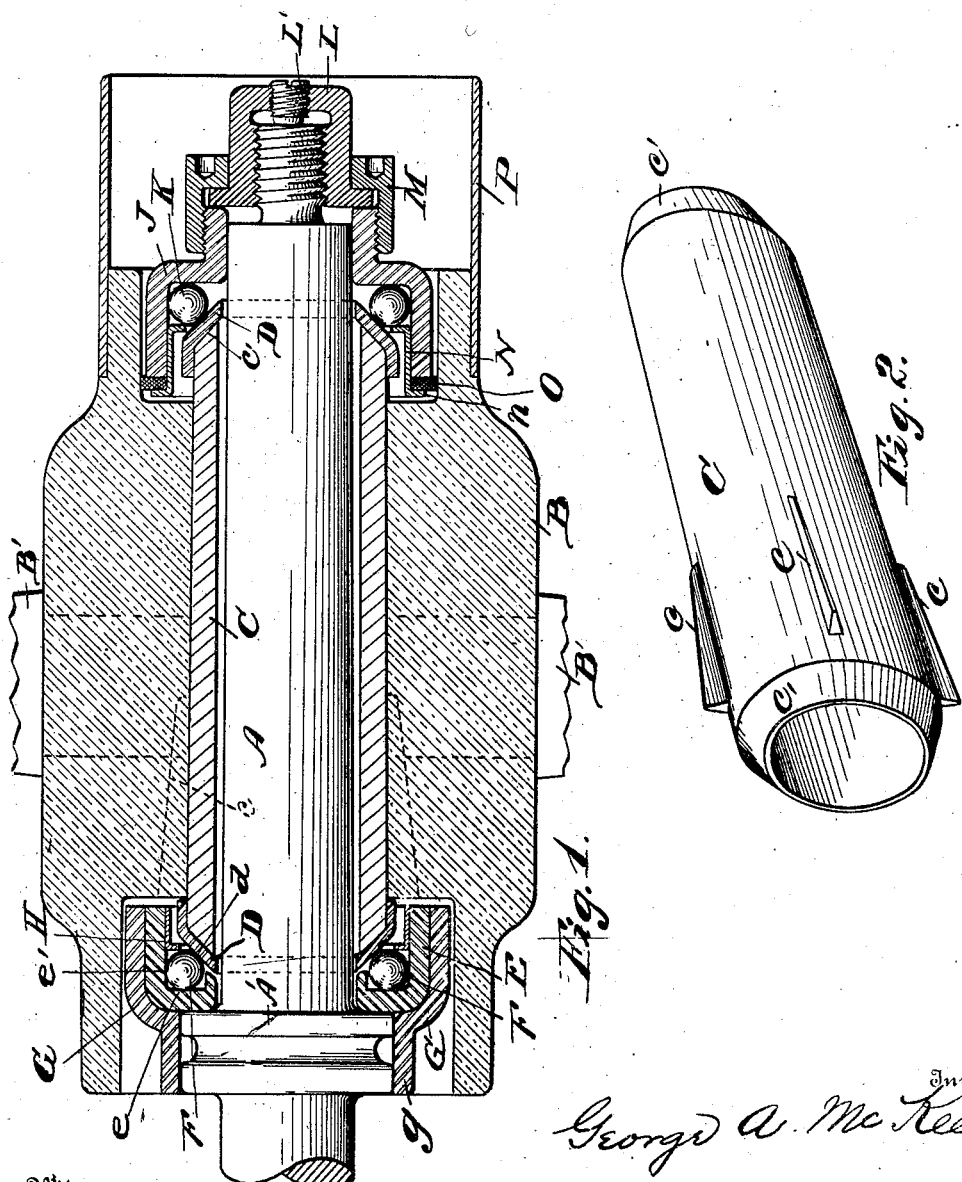
Witnesses
Grace E. Wynkoop.
Lewis A. Flanders
Inventor
George A. McKeel
By S. E. Thomas
Attorney

UNITED STATES PATENT OFFICE.

GEORGE A. McKEEL, OF JACKSON, MICHIGAN, ASSIGNOR TO GEORGE A. McKEEL & COMPANY, LIMITED, OF JACKSON, MICHIGAN, A PARTNERSHIP ASSOCIATION OF MICHIGAN.

VEHICLE-HUB.

No. 874,697.     Specification of Letters Patent.     Patented Dec. 24, 1907.

Application filed June 29, 1907. Serial No. 381,397.

*To all whom it may concern:*

Be it known that I, GEORGE A. McKEEL, a citizen of the United States, residing at Jackson, county of Jackson, State of Michigan, have invented a certain new and useful Improvement in Vehicle-Hubs, and declare the following to be a full, clear, and exact description of the same, such as will enable others skilled in the art to which it pertains to make and use the same, reference being had to the accompanying drawings, which form a part of this specification.

My invention relates to an improvement in vehicle hubs shown in the accompanying drawings and more particularly pointed out in the following specification and claims.

In the drawings:—Figure 1 is a longitudinal section through the hub showing it mounted on an axle. Fig. 2 is a perspective view of the sleeve engaging the wooden portion of the hub.

The object of my invention is an improvement in the general construction of vehicle hubs in which the metal parts are largely formed of sheet metal struck up in a die press;—the purpose being to reinforce those portions which are usually weak in constructions of this character, while at the same time forming the hub of as few parts as possible, and these simple in character.

Referring now to the letters of reference shown on the drawings: A represents the axle, B the wooden hub, and B' its spokes.

C is a sleeve loosely encircling the axle and having radial fins $c$ formed integral therewith which enter suitable grooves in the wooden hub with which it turns. The ends of the sleeve C are tapering or beveled, as indicated at $c'$, to conform to the cone shaped cups D which encircle their ends.

E is a ball cup struck up of sheet metal (being L-shaped in cross section) encircling the axle adjacent to the shoulder A', in which are housed the balls F, which contact with the cups D at the point $d$ and with the cup E at $e$ and $e'$.

G is an outer or auxiliary cup in which is set the ball cup E, serving to reinforce and stiffen the latter and having an annular collar $g$ encircling the shoulder A' of the axle A and fixed thereto. The auxiliary cup G is preferably secured to the axle by a driving fit though it may be engaged by insertion of a key.

H is a ball retainer sleeved within the ball cup E.

J is a ball cup on the outer end of the axle, and K are the balls inclosed within, bearing on the inclined face of the cup D and having a two point contact with the cup J.

L is a nut screwed on the end of the axle over which is sleeved the lock nut M having a screw-threaded engagement with the cup J.

L' is a set screw, supported in the nut L, contacting with the end of the axle, by means of which the adjustment of the nut L with respect to the ball cup J is regulated.

N is a ball retainer, sleeved within the cup J, provided with an outwardly turned flange $n$ between which and the cup J is housed a felt collar or dust guard O.

P is a sleeve mounted on the end of the wooden hub and projecting beyond the end of the nut L.

It will be seen that by adjusting the cup J and then setting the lock nut M, whose annular flange engages the projecting rim of the nut L, that all lateral movement or play between the parts may be taken up. It will also be noted that the ball retainer N serves the double purpose of a ball retainer and a support and holder for the dust guard O.

Attention is called to the fact that the end thrust of the balls on the cup D is practically taken up by the sleeve C set in the wooden hub.

The outer cup G stiffens and reinforces the ball cup E at points under the greatest strain, while its annular collar embraces the shoulder A' of the axle, being fixed thereto, and assists in protecting the bearing against the entry of dust.

Having thus described my invention, what I claim is:

1. In a ball bearing for vehicles, a wood portion, an axle, a sleeve adapted to loosely encircle the axle set in the wood portion, said sleeve beveled at its forward end to receive a cone shaped cup, the cone shaped cup supported on the end of the sleeve, a ball cup sleeved over the axle, a plurality of balls housed therein bearing on the inner walls of the ball cup, a nut designed to engage the end of the axle, provided with a projecting flange, and a lock nut having a screw-threaded engagement with the ball cup and adapted to engage the flange of the nut engaging the end of the axle.

2. In a ball bearing for vehicles, a wood portion, an axle, a sleeve adapted to loosely encircle the axle, set in the wood portion, said sleeve beveled at its forward end to receive a cone shaped cup, the cone shaped cup supported on the end of the sleeve, a ball cup sleeved over the axle, a plurality of balls housed therein bearing on the inner walls of the ball cup, a nut designed to engage the end of the axle, provided with a projecting flange, means for limiting the movement of the nut, and a lock nut having a screw-threaded engagement with the ball cup and adapted to engage the flange of the nut engaging the end of the axle.

3. In a ball bearing for vehicles, a wood portion, an axle, a sleeve adapted to loosely encircle the axle set in the wood portion being beveled at one end to receive a cone shaped cup, the cone shaped cup supported on the end of the sleeve, a ball cup sleeved over the axle, means for securing the ball cup in position, a plurality of balls housed therein, a ball retainer sleeved in the ball cup having an inwardly projecting flange to confine the balls and extending beyond the end of the ball cup and provided with an outwardly extending flange to support an annular dust guard, and the dust guard housed within the channel formed by the flange of the ball retainer and the end of the ball cup.

4. In a ball bearing for vehicles, a wood portion, an axle, a sleeve to encircle the axle housed within the wood portion and rotating therewith, said sleeve beveled at both ends, a pair of cone shaped cups encircling the ends of the sleeve, a ball cup, a reinforcing cup within which the ball cup is housed having an annular collar adapted to engage the axle, a ball cup for the outer end of the hub, a nut adapted for screw-threaded engagement with the end of the axle to adjust the ball cup, means for controlling the movement of said nut, and a lock nut having a screw-threaded engagement with the ball cup also adapted to control the movement of said nut.

In testimony whereof, I sign this specification in the presence of two witnesses.

GEORGE A. McKEEL.

Witnesses:
SAMUEL E. THOMAS,
GRACE E. WYNKOOP.